(12) United States Patent
Guo et al.

(10) Patent No.: US 12,510,693 B2
(45) Date of Patent: Dec. 30, 2025

(54) METHOD FOR MANUFACTURING LIGHT FIELD DISPLAY DEVICE AND LIGHT FIELD DISPLAY DEVICE

(71) Applicant: BOE TECHNOLOGY GROUP CO., LTD., Beijing (CN)

(72) Inventors: Kang Guo, Beijing (CN); Mengya Song, Beijing (CN); Duohui Li, Beijing (CN); Xin Gu, Beijing (CN); Feng Zhang, Beijing (CN); Meili Wang, Beijing (CN); Fei Wang, Beijing (CN); Renquan Gu, Beijing (CN); Qi Yao, Beijing (CN); Guangcai Yuan, Beijing (CN); Xue Dong, Beijing (CN); Jing Yu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 752 days.

(21) Appl. No.: 17/575,511

(22) Filed: Jan. 13, 2022

(65) Prior Publication Data

US 2022/0229209 A1 Jul. 21, 2022

(30) Foreign Application Priority Data

Jan. 18, 2021 (CN) .......................... 202110060930.6

(51) Int. Cl.
*G02B 3/00* (2006.01)
*H01L 33/00* (2010.01)
(Continued)

(52) U.S. Cl.
CPC ......... *G02B 3/0012* (2013.01); *G02B 3/0056* (2013.01); *H10H 20/01* (2025.01); *H10H 20/855* (2025.01); *H10H 20/0363* (2025.01)

(58) Field of Classification Search
CPC .. G02B 3/0012; G02B 3/0056; G02B 3/0031; G02B 7/003; H01L 33/58
(Continued)

(56) References Cited

U.S. PATENT DOCUMENTS

2011/0075256 A1 3/2011 De Zwart et al.
2011/0249093 A1 10/2011 Yeh et al.
(Continued)

FOREIGN PATENT DOCUMENTS

CN 102047169 A 5/2011
CN 104898291 A 9/2015
(Continued)

OTHER PUBLICATIONS

State Intellectual Property Office of the People's Republic of China, Office Action and Search Report Issued in Application No. 202110060930.6, Apr. 27, 2024, 16 pages. (Submitted with Partial Translation).

*Primary Examiner* — Stephone B Allen
*Assistant Examiner* — Boutsikaris Leonidas
(74) *Attorney, Agent, or Firm* — McCoy Russell LLP (57) ABSTRACT

A method for manufacturing a light field display device and a light field display device are provided, the method includes: forming a plano-concave lens layer on a substrate, and the plano-concave lens layer comprises a plurality of plano-concave lenses arranged in an array and a plurality of alignment marks arranged at preset positions; forming a first planarization layer covering the plano-concave lens layer to form a microlens array, the first planarization layer having a refractive index greater than a refractive index of the plano-concave lens layer; attaching the light-emitting side of the display panel to a side of the microlens array away from the substrate according to the alignment mark.

20 Claims, 5 Drawing Sheets

(51) Int. Cl.
*H01L 33/58* (2010.01)
*H10H 20/01* (2025.01)
*H10H 20/855* (2025.01)

(58) Field of Classification Search
USPC .......................................................... 359/719
See application file for complete search history.

(56) References Cited

U.S. PATENT DOCUMENTS

| | | | | |
|---|---|---|---|---|
| 2012/0273981 | A1* | 11/2012 | Yu | G02B 3/0031 |
| | | | | 264/1.7 |
| 2014/0113134 | A1* | 4/2014 | Kim | C03C 17/04 |
| | | | | 501/27 |
| 2014/0118664 | A1* | 5/2014 | Nimura | G02B 3/0056 |
| | | | | 349/95 |
| 2015/0002790 | A1* | 1/2015 | Ito | G02B 3/0018 |
| | | | | 349/95 |
| 2016/0097883 | A1 | 4/2016 | Wakabayashi | |
| 2017/0003513 | A1 | 1/2017 | Cho et al. | |
| 2017/0315272 | A1* | 11/2017 | Che | G02B 3/005 |
| 2018/0210219 | A1 | 7/2018 | Lin | |
| 2022/0121023 | A1* | 4/2022 | Jeong | G02B 3/0056 |
| 2023/0064314 | A1* | 3/2023 | Kumazaki | H01S 3/10069 |

FOREIGN PATENT DOCUMENTS

| | | | | | |
|---|---|---|---|---|---|
| CN | 104977772 | A | | 10/2015 | |
| CN | 105158916 | A | | 12/2015 | |
| CN | 106773446 | A | | 5/2017 | |
| EP | 2597504 | A2 | | 5/2013 | |
| JP | 2010002925 | A | | 1/2010 | |
| JP | 2014092601 | A | * | 5/2014 | |
| JP | 2017120445 | A | * | 7/2017 | ........... G02B 27/149 |

* cited by examiner

METHOD FOR MANUFACTURING LIGHT FIELD DISPLAY DEVICE AND LIGHT FIELD DISPLAY DEVICE

CROSS-REFERENCE TO RELATED APPLICATION

The present application claims priority to Chinese Patent Application No. 202110060930.6 filed on Jan. 18, 2021. The entire contents of the above-listed application are hereby incorporated by reference for all purposes.

TECHNICAL FIELD

The present disclosure relates to the field of display technology, and in particular to a method for manufacturing a light field display device and a light field display device.

BACKGROUND

In the naked-eye 3D or light field display technology, the nanoimprint resist technology is mainly used to fabricate the microlens array substrate. This method needs to fabricate the microlens array (MLA) template. There are two ways to fabricate MLA template: single-point diamond and thermal reflow lithography. Wherein, in the process of using single-point diamond for MLA template, there are problems such as high cost and difficulty in large size. Thermal reflow lithography has the advantages of low cost and large size, and the thermal reflow method is difficult to realize the fabrication of close-coupled lenses, but the effect of close-coupled lenses can be achieved by adding a light shielding layer between lenses.

SUMMARY

In order to solve at least one of the above problems, a first aspect of the present disclosure provides a method for manufacturing a light field display device, comprising:
  forming a plano-concave lens layer on a substrate, wherein the plano-concave lens layer comprises a plurality of plano-concave lenses arranged in an array and a plurality of alignment marks arranged at preset positions;
  forming a first planarization layer covering the plano-concave lens layer to form a microlens array, the first planarization layer having a refractive index greater than a refractive index of the plano-concave lens layer;
  attaching the light-emitting side of the display panel to a side of the microlens array away from the substrate according to the alignment mark.

Optionally, the plano-concave lens layer further comprises a spacer portion provided between two adjacent plano-concave lenses, and forming a first planarization layer covering the plano-concave lens layer to form the microlens array further comprises:
  forming a plurality of light shielding portions on the first planarization layer according to the alignment mark, wherein an orthographic projection of the light shielding portions on the substrate covers an orthographic projection of the spacer portions on the substrate;
  forming a second planarization layer covering the light shielding portion and the first planarization layer on the light shielding portion and the exposed first planarization layer to form a microlens array.

Optionally, attaching the light-emitting side of the display panel to a side of the microlens array away from the substrate according to the alignment mark further comprises:
  attaching the light-emitting side of the display panel to a side of the second planarization layer away from the substrate according to the alignment mark.

Optionally, forming a plurality of light shielding portions on the first planarization layer according to the alignment mark further comprises:
  forming a light shielding layer on the first planarization layer;
  forming a plurality of light shielding portions according to the alignment mark patterning the light shielding layer.

Optionally, the length of the spacer portion is less than or equal to 5 μm;
  and/or
  the light shielding portion is a black matrix, the length of the light shielding portion is greater than or equal to the length of the spacer portion and less than or equal to 10 μm, and the thickness of the light shielding portion is greater than or equal to 1 μm and less than or equal to 3 μm;
  and/or
  the thickness of the second planarization layer is greater than or equal to 2 μm and less than or equal to 5 μm.

Optionally, forming a plano-concave lens layer on the substrate, the plano-concave lens layer comprising a plurality of plano-concave lenses arranged in an array and a plurality of alignment marks arranged at preset positions further comprises:
  coating a nanoimprint resist on a substrate to form an imprint resist layer;
  forming a plano-concave lens layer by imprinting the imprint resist layer using a preset nanoimprint template, wherein the nanoimprint template comprises a plurality of convex lenses arranged in an array and a plurality of alignment marks arranged at preset positions.

Optionally, the aperture of the plano-concave lens is greater than or equal to 5 μm and less than or equal to 500 μm, and the arch height of the plano-concave lens is greater than or equal to 2 μm and less than or equal to 50 μm;
  and/or
  the thickness of the plano-concave lens layer is greater than or equal to 5 μm and less than or equal to 50 μm, the refractive index of the plano-concave lens layer is greater than or equal to 1.3 and less than or equal to 1.45, and the transmittance of the plano-concave lens layer is greater than 80%;
  and/or
  the thickness of the first planarization layer is greater than or equal to 5 μm and less than or equal to 50 μm, the refractive index of the first planarization layer is greater than or equal to 1.55 and less than or equal to 1.75, and the transmittance of the first planarization layer is greater than 80%.

A second aspect of the present disclosure provides a light field display device, comprising a display panel and a microlens array arranged on a light-emitting side of the display panel, wherein the microlens array comprises a substrate, a plano-concave lens layer and a first planarization layer which are arranged on the substrate and are far and near from the display panel in sequence, the plano-concave lens layer comprises a plurality of plano-concave lenses arranged in an array and a plurality of alignment marks arranged at preset positions, and the refractive index of the first planarization layer is greater than the refractive index of the plano-concave lens layer.

In some alternative embodiments, the plano-concave lens layer of the microlens array further comprises a spacer portion disposed between two adjacent plano-concave lenses, the microlens array further comprises a light shielding portion disposed on the first planarization layer, and a second planarization layer covering the light shielding portion and the exposed first planarization layer, the orthographic projection of the light shielding portion on the substrate covering the orthographic projection of the spacer portion on the substrate.

Optionally, the display panel is one of a liquid crystal display panel, an electroluminescent display panel, a quantum dot light emitting display panel, a micro LED display panel, a Micro LED display panel, and a Mini LED display panel.

Optionally, the length of the spacer portion is less than or equal to 5 µm.

Optionally, the light shielding portion is a black matrix, wherein the length of the light shielding portion is equal to or greater than the length of the spacer portion and equal to or less than 10 µm, and the thickness of the light shielding portion is equal to or greater than 1 µm and equal to or less than 3 µm.

Optionally, the thickness of the second planarization layer is greater than or equal to 2 µm and less than or equal to 5 µm.

Optionally, the aperture of the plano-concave lens is greater than or equal to 5 µm and less than or equal to 500 µm, and the arch height of the plano-concave lens is greater than or equal to 2 µm and less than or equal to 50 µm.

Optionally, the thickness of the plano-concave lens layer is equal to or more than 5 µm and equal to or less than 50 µm, the refractive index of the plano-concave lens layer is equal to or more than 1.3 and equal to or less than 1.45, and the transmittance of the plano-concave lens layer is greater than 80%.

Optionally, the thickness of the first planarization layer is greater than or equal to 5 µm and less than or equal 50 µm, the refractive index of the first planarization layer is greater than or equal to 1.55 and less than or equal to 1.75, and the transmittance of the first planarization layer is greater than 80%.

BRIEF DESCRIPTION OF THE DRAWINGS

In order to explain the technical solutions of embodiments of the present disclosure more clearly, the following description is given with reference to the drawings, which are required to be used in the description of embodiments; it is obvious that the drawings in the following description are only some embodiments of the present disclosure, and persons skilled in the art would have been able to obtain other drawings according to these drawings without involving any inventive effort.

DETAILED DESCRIPTION

To more clearly illustrate the present disclosure, a further description of the disclosure is provided below in connection with some embodiments and drawings. Like parts in the drawings are denoted by the same reference numerals. It is to be understood by persons of ordinary skill in the art that the following detailed description is intended to be illustrative and not restrictive, and that it is not intended to limit the scope of the present disclosure.

It should be noted that references herein to "on", "formed on", and "disposed on" may mean that one layer is formed or disposed directly on another layer, or that one layer is formed or disposed indirectly on another layer, i.e., there may be additional layers between the two layers.

At present, the plano-convex lens is firstly manufactured by using nanoimprint technology from bottom to top. In the process of forming the plano-convex lens, the size of the lens is relatively large, the aperture is generally in a few hundreds of microns, and the arch height is generally in a few tens of microns. Strict requirements are imposed on the imprinting method and the imprint resist materials, otherwise it is difficult to achieve nearly 100% structure filling. In addition, the traditional bottom-up method is to use an alignment device of an imprinting device to align a plano-convex lens imprinting layer and a front film light-shielding layer in an overlapping manner, but due to poor alignment accuracy of nanoimprint, especially a large size (greater than 12 inches), which is generally above a few hundred micrometers, resulting in a large deviation from the light-shielding layer.

Figure 1:
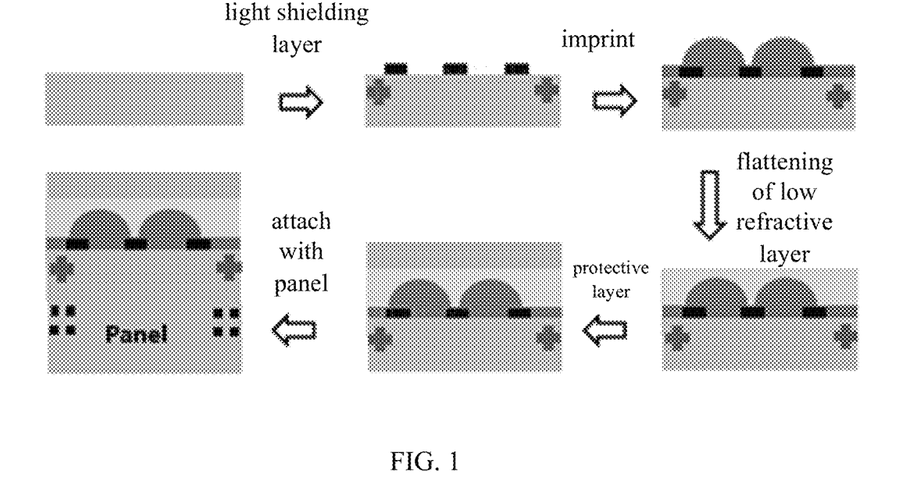
FIG. 1 shows a schematic diagram of a method for manufacturing a light field display device from bottom to top in the related art.

Especially when the plano-convex lenses are arranged non-tightly, the alignment problem is more pronounced. FIG. 1 shows a process flow of manufacturing a display device in the related art. An alignment mark is first made on the substrate, and a patterned light-shielding layer is made based on the alignment mark. Subsequently, the plano-convex lens with high refractive index is imprinted based on the alignment mark, followed by flattening of low refractive layer, fabrication of the protective layer, and attaching process with the display panel. Since the alignment of the lens layer and the light shielding layer is performed using the alignment apparatus of the nanoimprint apparatus herein, there is a problem that the alignment accuracy is poor, resulting in misalignment of the lens and the light-shielding layer. In addition, the bottom-up manufacturing method imprints a plano-convex lens, and since the insist material utilizes the principle of capillary tension, the upward filling process has a problem that it is difficult to fill a hundred-percent structure for a large-sized lens, which leads to a problem of lens uniformity and poor reproducibility in the overall lens array.

Figure 2:
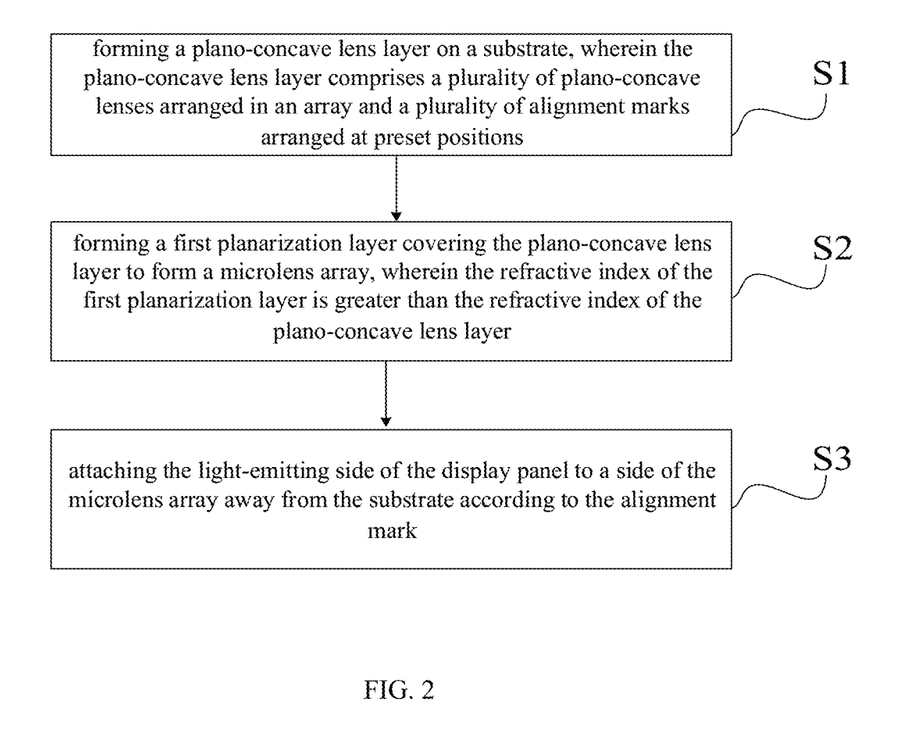
FIG. 2 shows a schematic block diagram of a method for manufacturing a light field display device according to embodiments of the present disclosure.

Based on one of the above problems, as shown in FIG. 2, one embodiment of the present disclosure provides a method for manufacturing a light field display device, comprising:

S1, forming a plano-concave lens layer on a substrate, wherein the plano-concave lens layer comprises a plurality of plano-concave lenses arranged in an array and a plurality of alignment marks arranged at preset positions;

S2, forming a first planarization layer covering the plano-concave lens layer to form a microlens array, wherein the refractive index of the first planarization layer is greater than the refractive index of the plano-concave lens layer;

S3, attaching the light-emitting side of the display panel to a side of the microlens array away from the substrate according to the alignment mark.

In the present embodiment, a microlens array is formed by forming a plano-concave lens layer on a substrate in a top-down manner and forming a first planarization layer on the plano-concave lens layer, wherein the alignment marks included in the plano-concave lens layer is used to align with the display panel, so that the lens structure is sufficiently filled during the lens forming process, and thus the formed lens with a wide application prospect has good uniformity while being able to achieve accurate alignment with the display panel.

Specific embodiments are described further below with reference to FIGS. 3-9.

Figure 3:
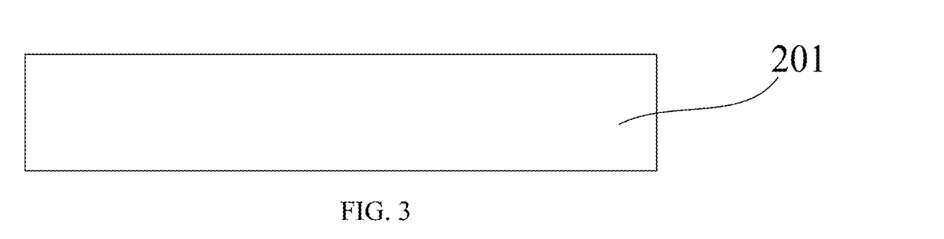
FIGS. 3-9 show cross-sectional views of a manufacturing flow of a manufacturing method for a light field display device according to embodiments of the present disclosure.
Figure 4:
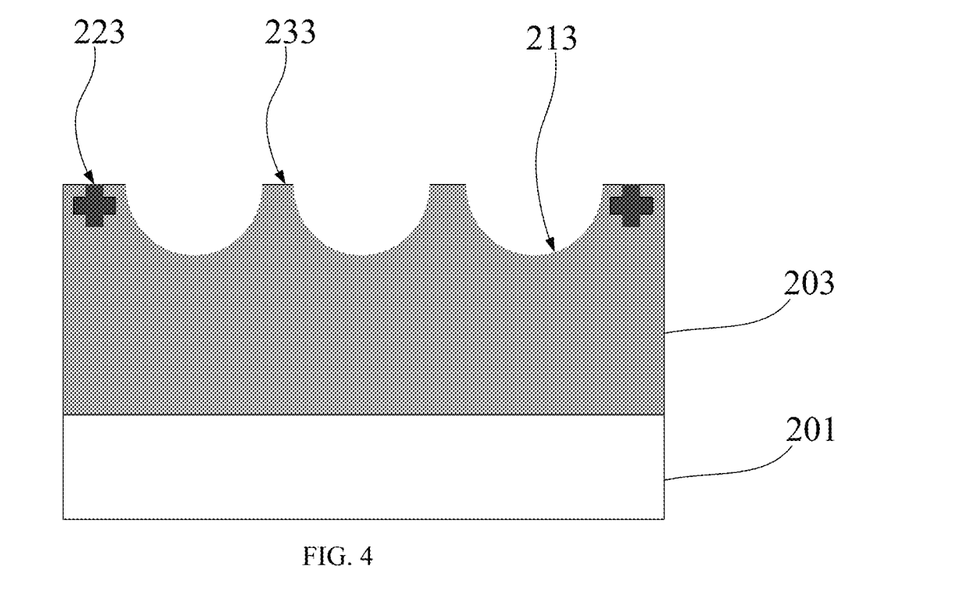

In step S1, as shown in FIGS. 3-4, a plano-concave lens layer 203 is first formed on the provided substrate 201. The plano-concave lens layer 203 includes a plurality of plano-concave lenses 213 and a plurality of alignment marks 223 disposed at preset positions.

Specifically, in the present embodiment, a nanoimprint resist is coated on a substrate 201 to form an imprint resist layer, and then the nanoimprint template is used to imprint the imprint resist layer to form the plano-concave lens layer 203, wherein the nanoimprint template comprises a plurality of convex lenses arranged in an array and a plurality of alignment marks arranged at preset positions.

Optionally, the aperture of the plano-concave lens 213 is greater than or equal to 5 μm and less than or equal to 500 μm, and an arch height is greater than or equal to 2 μm and less than or equal to 50 μm.

Optionally, the thickness of the plano-concave lens layer 203 is greater than or equal to 5 μm and less than or equal to 50 μm.

It should be noted that although the drawings show the alignment marks as cross-shaped in cross-section, and show the inclusion of two alignment marks, the present disclosure is not intended to be limited to the specific shape and the specific number of alignment marks, and the appropriate shape and number may be selected according to specific design requirements. In addition, a plurality of plano-concave lenses and a plurality of alignment marks may be simultaneously formed by one imprint template, or a plurality of plano-concave lenses and a plurality of alignment marks may be sequentially formed by two imprint templates including a plano-convex lens and an alignment mark, respectively, and the present disclosure is not intended to be limiting.

Figure 5:
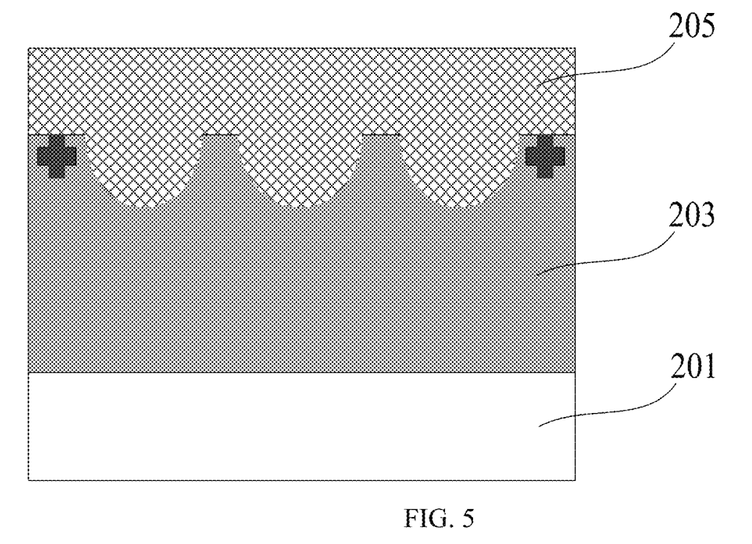

In step S2, as shown in FIG. 5, a first planarization layer 205 covering the plano-concave lens layer 203 is formed on the plano-concave lens layer 203 to form a microlens array, i.e., a microlens is formed using the topography of the plano-concave lens with the portion of the planarization layer 205 filled into the plano-concave lens 213, thereby forming a microlens array. The refractive index of the first planarization layer 205 is greater than the refractive index of the plano-concave lens 203 so as to realize the modulation effect of the lens array on light rays and improve the light-emitting efficiency.

Specifically, in the present embodiment, the refractive index of the plano-concave lens layer 203 is greater than or equal to 1.3 and less than or equal to 1.45, the transmittance of the plano-concave lens layer is greater than 80%, the refractive index of the first planarization layer 205 is greater than or equal to 1.55 and less than or equal to 1.75, and the transmittance of the first planarization layer 205 is greater than 80%.

Figure 6:
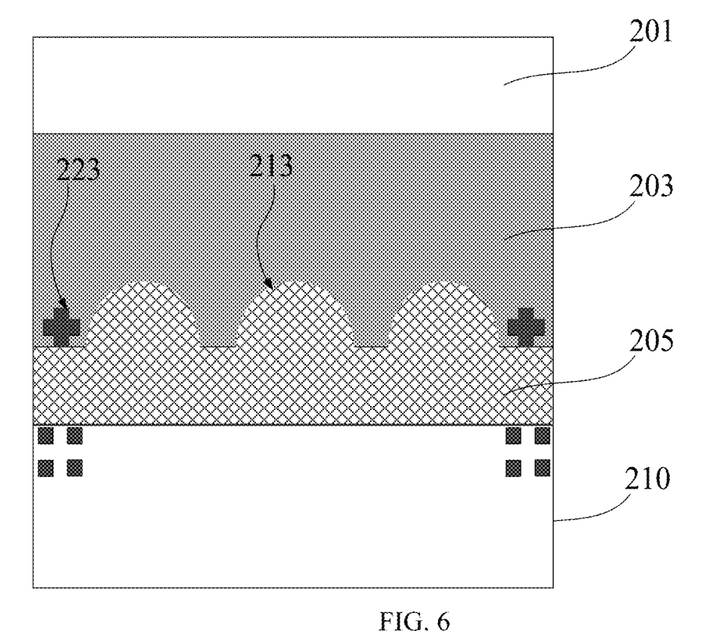

In step S3, as shown in FIG. 6, the light-emitting side of the display panel 210 is attached to the side of the microlens array away from the substrate 201 according to the alignment marks 223. Specifically, according to the alignment mark 223, the light-emitting side of the display panel 210 is attached to a side of the first planarization layer 205 away from the substrate 201. It will be understood by those skilled in the art that there is an alignment mark corresponding to the position and shape of the alignment mark 223 in the display panel when the attaching is performed, and the alignment mark is illustrated by four black squares in the drawing, but this application is not intended to be limiting and will not be described in detail herein.

Considering that the light efficiency is affected by the non-closely arranged lens array, in some alternative embodiments, as shown in FIG. 4, the formed a plurality of plano-concave lenses 213 are non-closely arranged, i.e. the plano-concave lens layer 201 further comprises a spacer portion 233 between two adjacent plano-concave lenses 213, and a light shielding portion is further formed on the first planarization layer.

In addition, it will be understood by those skilled in the art that the alignment mark 223 may be provided in the spacer portion 233 when the formed a plurality of plano-concave lenses 213 are not closely arranged, and there is no more restriction on this.

Figure 7:
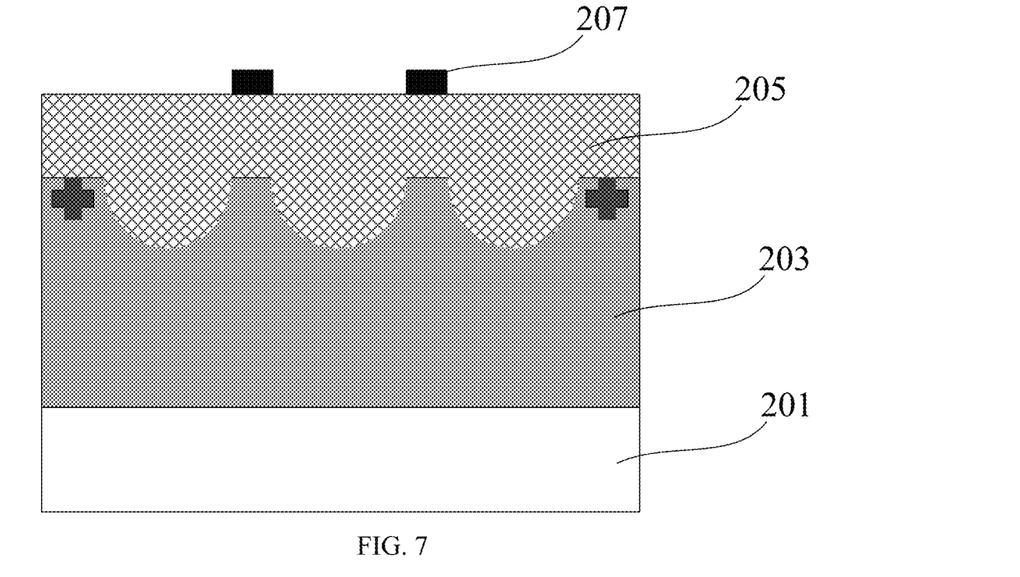
Figure 8:
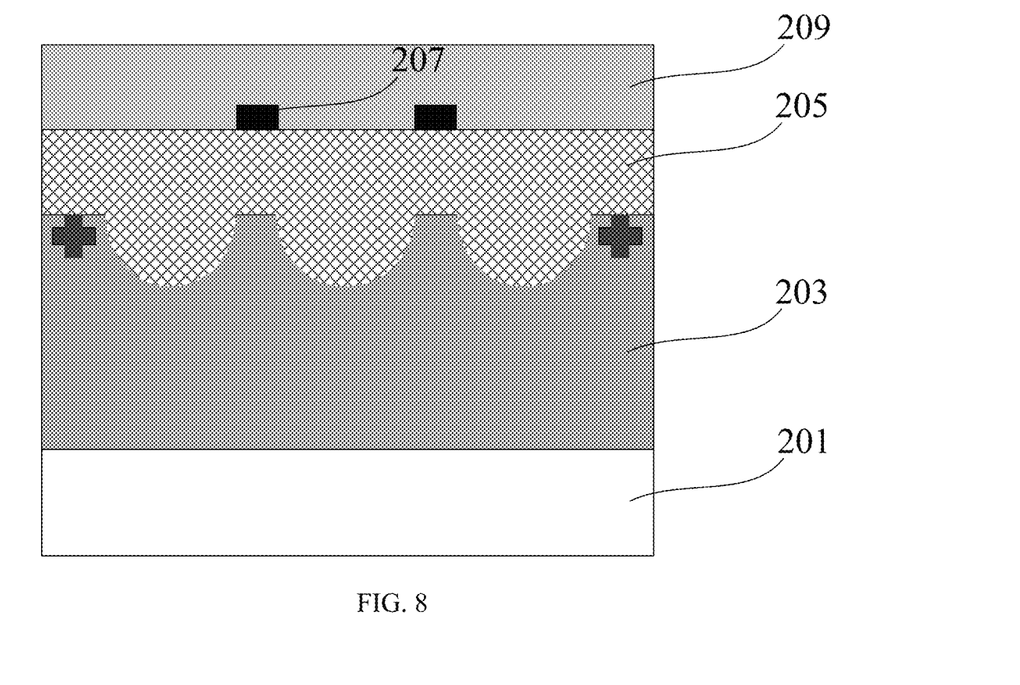

Specifically, forming a first planarization layer 205 covering the plano-concave lens layer 203 to form a microlens array further includes: as shown in FIG. 7, a plurality of light shielding portions 207 are formed on the first planarization layer 205 according to the alignment mark 223, and the orthographic projections of the light shielding portions 207 on the substrate 201 covers the orthographic projections of the spacer portions 233 on the substrate 201; as shown in FIG. 8, a second planarization layer 209 covering the light shielding part 207 and the first planarization layer 205 is formed on the light shielding part 207 and the exposed first planarization layer 205 to form a microlens array.

Specifically, in the present embodiment, a plurality of light shielding portions 207 are formed by forming a light shielding layer on the first planarization layer 205 and patterning the light shielding layer with a mask plate according to the alignment marks 223. The light shielding section 207 constitutes a black matrix, and the light-emitting effect of the lens array closely arranged can be achieved by forming the light shielding section 207.

In addition, it should be noted that, the spacer portion 233 between two adjacent plano-concave lenses 213 in the plano-concave lens layer 201 should be 5 micron or less in order to realize the light-emitting effect of the close-coupled arranged microlens array. The length of the light shielding portion 207 along the surface of the first planarization layer 205 is greater than the length of the spacer portion 233, and the thickness of the light shielding portion is greater than or equal to 1 μm and less than or equal than 3 μm.

Optionally, the thickness of the second planarization layer 209 is greater than or equal to 2 μm and less than or equal than 5 μm.

Figure 9:
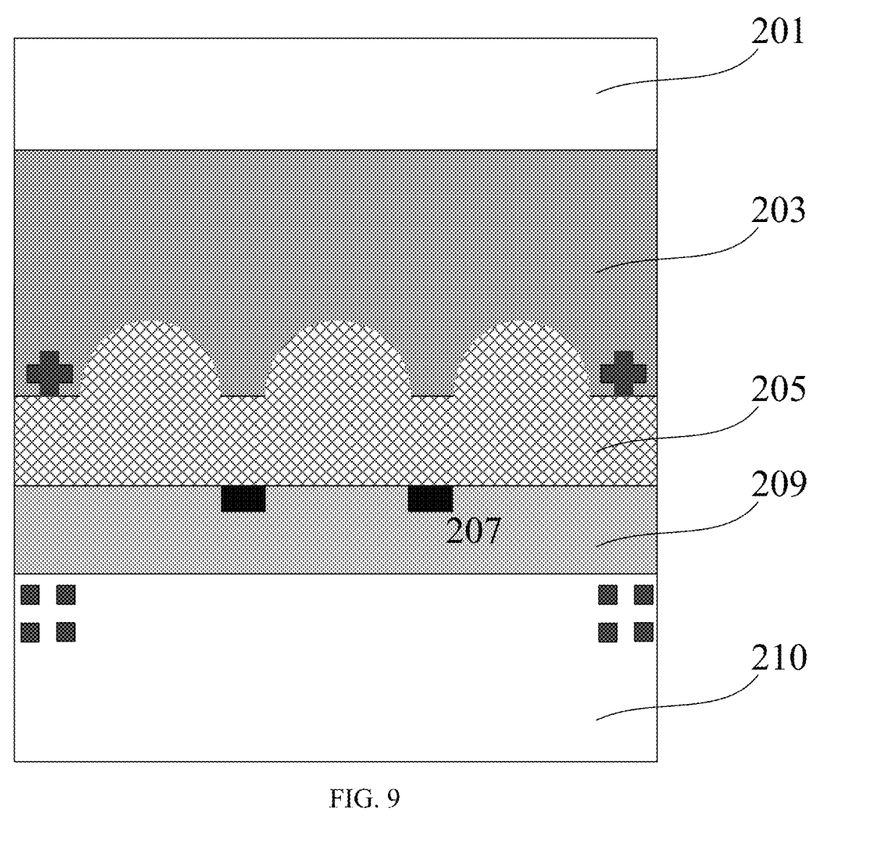

In step S3, as shown in FIG. 9, the light-emitting side of the display panel 210 is attached to the side of the microlens array remote from the substrate 201 according to the alignment marks 223. Specifically, according to the alignment mark 223, the light-emitting side of the display panel 210 is attached to the side of the second planarization layer 209 away from the substrate 201. It will be understood by those skilled in the art that there is an alignment mark corresponding to the position and shape of the alignment mark 223 in the display panel when the attaching is performed, and the alignment mark is illustrated by four black squares in the figure, but this application is not intended to be limiting and will not be described in detail herein.

With regard to a method for manufacturing a light field display device, as shown in FIG. 6, embodiments of the present disclosure also provide a light field display device manufactured by using the manufacturing method described in the above-mentioned embodiments, comprising a display panel 210 and a microlens array arranged the light-emitting side of the display panel 210, wherein the microlens array comprises a substrate 201, a plano-concave lens layer 203 and a first planarization layer 205 which are successively arranged on the substrate 201 and are far and near from the display panel 210, the plano-concave lens layer comprising a plurality of plano-concave lenses 213 arranged in an array and a plurality of alignment marks 223 arranged at preset positions, the refractive index of the first planarization layer 205 larger than that of the plano-concave lens layer 203.

In the present embodiment, a display device is formed by including a display panel and a microlens array formed by forming a plano-concave lens layer on a substrate in a top-down manner and forming a first planarization layer on the plano-concave lens layer, and the display device is formed by aligning the display panel with alignment marks included in the plano-concave lens layer, so that the formed lens structure is sufficiently filled, and thus the formed lens has good uniformity while being able to achieve precise alignment with the display panel, which has a wide application prospect.

In some alternative embodiments, as shown in FIG. 9, the plano-concave lens layer 205 of the microlens array further comprises a spacer portion 233 arranged between two adjacent plano-concave lenses 213, and the microlens array further comprises a light shielding portion 207 arranged on the first planarization layer 205, and a second planarization layer 209 covering the light shielding portion 207 and the exposed first planarization layer 205, wherein the orthographic projection of the light shielding portion 207 on the substrate 201 covering the orthographic projection of the spacer portion 233 on the substrate 201. By providing the light shielding portion, the light shielding portion can shield the spacer portion and prevent light from directly transmitting through the spacer portion to form stray light, thereby improving light efficiency.

In embodiments of the present disclosure, the display panel is one of a liquid crystal display panel, an electroluminescent display panel, a quantum dot display panel, a micro LED display panel, a Micro LED display panel and a Mini LED display panel.

In addition, the light field display device provided by the present disclosure can be any product or component having a display function such as a mobile phone, a tablet computer, a television, a display, a notebook computer, a digital photo frame, a navigator, etc. Other essential components of the display device will be understood by those skilled in the art and will not be described in detail herein and should not be taken as a limitation on the present application.

In view of the problems in the related art, the present disclosure proposes a method for manufacturing a light field display device and a light field display device, wherein a microlens array is formed by forming a plano-concave lens layer on a substrate and forming a first planarization layer on the plano-concave lens layer in a top-down manner, and an alignment mark included in the plano-concave lens layer is used to align with a display panel, so that the lens structure is sufficiently filled during the lens forming process, so that the formed lens has good uniformity and can be accurately aligned with the display panel, which has a wide application prospect.

It will be obvious that the above-mentioned embodiments of the present disclosure are merely examples for clearly illustrating the present disclosure, rather than limiting embodiments of the present disclosure, and that various other changes and modifications may be made by those skilled in the art based on the above description, thus it is not intended to be exhaustive or to limit the invention to the embodiments disclosed, and all such obvious changes and modifications fall within the scope of the present disclosure.

The invention claimed is:

1. A method for manufacturing a light field display device, comprising:
   coating a nanoimprint resist on a substrate to form an imprint resist layer;
   forming a plano-concave lens layer on the substrate by imprinting the imprint resist layer using a nanoimprint template, wherein the plano-concave lens layer comprises a plurality of plano-concave lenses arranged in an array and a plurality of alignment marks arranged at preset positions, and the concave openings of the plurality of plano-concave lenses face a direction away from the substrate;
   forming a first planarization layer covering the plano-concave lens layer to form a microlens array, the first planarization layer having a refractive index greater than a refractive index of the plano-concave lens layer; and
   attaching the light-emitting side of a display panel to a side of the microlens array away from the substrate according to the plurality of alignment marks;
   wherein the first planarization layer is at a side of the plano-concave lens layer adjacent to the display panel, and
   wherein the plano-concave lens layer further includes a plurality of spacer portions disposed between every two adjacent plano-concave lenses, and the plurality of alignment marks are arranged at a part of or all of the plurality of spacer portions.

2. The manufacturing method according to claim 1, wherein the forming a first planarization layer covering the plano-concave lens layer to form a microlens array further comprises:
   forming a plurality of light shielding portions on the first planarization layer according to the plurality of alignment marks, an orthographic projection of the light shielding portions on the substrate covering an orthographic projection of the spacer portions on the substrate;
   forming a second planarization layer covering the light shielding portions and the first planarization layer on the light shielding portions and the exposed first planarization layer to form a microlens array.

3. The manufacturing method according to claim 2, wherein the attaching a light-emitting side of the display panel to a side of the microlens array away from the substrate according to the plurality of alignment marks further comprises:
   attaching a light-emitting side of a display panel to a side of the second planarization layer away from the substrate according to the plurality of alignment marks.

4. The manufacturing method according to claim 2, wherein the forming a plurality of light shielding portions on the first planarization layer according to the plurality of alignment marks further comprises:

forming a light shielding layer on the first planarization layer; and forming a plurality of light shielding portions by patterning the light shielding layer according to the plurality of alignment marks.

5. The manufacturing method according to claim 2, wherein the length of the spacer portion is less than or equal to 5 μm.

6. The manufacturing method according to claim 2, wherein the light shielding portion is a black matrix, the length of the light shielding portion is greater than or equal to the length of the spacer portion and less than or equal to 10 μm, and the thickness of the light shielding portion is greater than or equal to 1 μm and less than or equal to 3 μm.

7. The manufacturing method according to claim 2, wherein the thickness of the second planarization layer is greater than or equal to 2 μm and less than or equal to 5 μm.

8. The manufacturing method according to claim 1, wherein the nanoimprint template comprises a plurality of convex lenses arranged in an array and a plurality of alignment marks arranged at preset positions.

9. The manufacturing method according to claim 1, wherein the aperture of the plano-concave lens is greater than or equal to 5 μm and less than or equal to 500 μm, and the arch height of the plano-concave lens is greater than or equal to 2 μm and less than or equal to 50 μm.

10. The manufacturing method according to claim 1, wherein the thickness of the plano-concave lens layer is greater than or equal to 5 μm and less than or equal to 50 μm, the refractive index of the plano-concave lens layer is greater than or equal to 1.3 and less than or equal to 1.45, and the transmittance of the plano-concave lens layer is greater than 80%.

11. The manufacturing method according to claim 1, wherein the thickness of the first planarization layer is greater than or equal to 5 μm and less than or equal to 50 μm, the refractive index of the first planarization layer is greater than or equal to 1.55 and less than or equal to 1.75, and the transmittance of the first planarization layer is greater than 80%.

12. A light field display device which is manufactured by the method according to claim 1 and comprises a display panel and a microlens array arranged on a light-emitting side of the display panel, wherein the microlens array comprises a substrate, a plano-concave lens layer and a first planarization layer which are arranged on the substrate and are far and near from the display panel in sequence, the plano-concave lens layer comprises a plurality of plano-concave lenses arranged in an array and a plurality of alignment marks arranged at preset positions, and the refractive index of the first planarization layer is greater than the refractive index of the plano-concave lens layer;

wherein the first planarization layer is at a side of the plano-concave lens layer adjacent to the display panel;

wherein the plano-concave lens layer further includes a plurality of spacer portions disposed between every two adjacent plano-concave lenses, and the plurality of alignment marks are arranged at a part of or all of the plurality of spacer portions.

13. The light field display device according to claim 12, wherein the microlens array further comprises a light shielding portion on the first planarization layer, and a second planarization layer covering the light shielding portion and the exposed first planarization layer, the orthographic projection of the light shielding portion on the substrate covering the orthographic projection of the spacer portion on the substrate.

14. The light field display device according to claim 12, wherein the display panel is one of a liquid crystal display panel, an electroluminescent display panel, a quantum dot light emitting display panel, a micro LED display panel, a Micro LED display panel and a Mini LED display panel.

15. The light field display device according to claim 13, wherein the length of the spacer portion is less than or equal to 5 μm.

16. The light field display device according to claim 13, wherein the light shielding portion is a black matrix, the length of the light shielding portion is greater than or equal to the length of the spacer portion and less than or equal to 10 μm, and the thickness of the light shielding portion is greater than or equal to 1 μm and less than or equal to 3 μm.

17. The light field display device according to claim 13, wherein the thickness of the second planarization layer is greater than or equal to 2 μm and less than or equal to 5 μm.

18. The light field display device according to claim 12, wherein the aperture of the plano-concave lens is greater than or equal to 5 μm and less than or equal to 500 μm, and the arch height of the plano-concave lens is greater than or equal to 2 μm and less than or equal to 50 μm.

19. The light field display device according to claim 12, wherein the thickness of the plano-concave lens layer is greater than or equal to 5 μm and less than or equal to 50 μm, the refractive index of the plano-concave lens layer is greater than or equal to 1.3 and less than or equal to 1.45, and the transmittance of the plano-concave lens layer is greater than 80%.

20. The light field display device according to claim 12, wherein the thickness of the first planarization layer is greater than or equal to 5 μm and less than or equal to 50 μm, the refractive index of the first planarization layer is greater than or equal to 1.55 and less than or equal to 1.75, and the transmittance of the first planarization layer is greater than 80%.

* * * * *